Sept. 8, 1959 H. G. JOHNSON 2,902,714
ROD EXTRUSION PRESS
Filed Aug. 23, 1955 2 Sheets-Sheet 1

INVENTOR
Herbert G. Johnson
BY Wm. R. Glisson
ATTORNEY

Sept. 8, 1959     H. G. JOHNSON     2,902,714
ROD EXTRUSION PRESS

Filed Aug. 23, 1955     2 Sheets-Sheet 2

INVENTOR
Herbert G. Johnson
BY Wm. R. Glisson
ATTORNEY

United States Patent Office 2,902,714
Patented Sept. 8, 1959

2,902,714

ROD EXTRUSION PRESS

Herbert G. Johnson, Havertown, Pa.

Application August 23, 1955, Serial No. 530,038

9 Claims. (Cl. 18—12)

This invention relates to a rod extrusion press adapted to extrude metal particles into a continuous rod or bar, such as a consumable electrode for use in a metal melting furnace, and has for an object the provision of improvements in this art. The press is especially adapted to consolidate particles of metals, such as titanium or the like, into coherent dense bars suitable for use in arc melting furnaces.

One of the particular objects of the invention is to provide a continuous bar extrusion press which compresses material laterally in increments of length and which releases the metal to prevent spalling or adhesion after each lateral compressing action and then, when the bar is released, which forces the bar forward by an increment of length through the space between lateral compressing elements.

Another object is to provide a continuous bar extrusion press having an improved longitudinal pusher which engages the more compacted core portion of the material to avoid the formation of improperly compressed sections or voids in the bar.

Another object is to provide improved means for operating the lateral and longitudinal rams which act on the material.

Another object is to provide means for heating the material as it is entering the compression zone to soften it.

Another object is to provide a continuous bar extrusion press which keeps the material free from air contamination while it is being processed.

Figure 1:
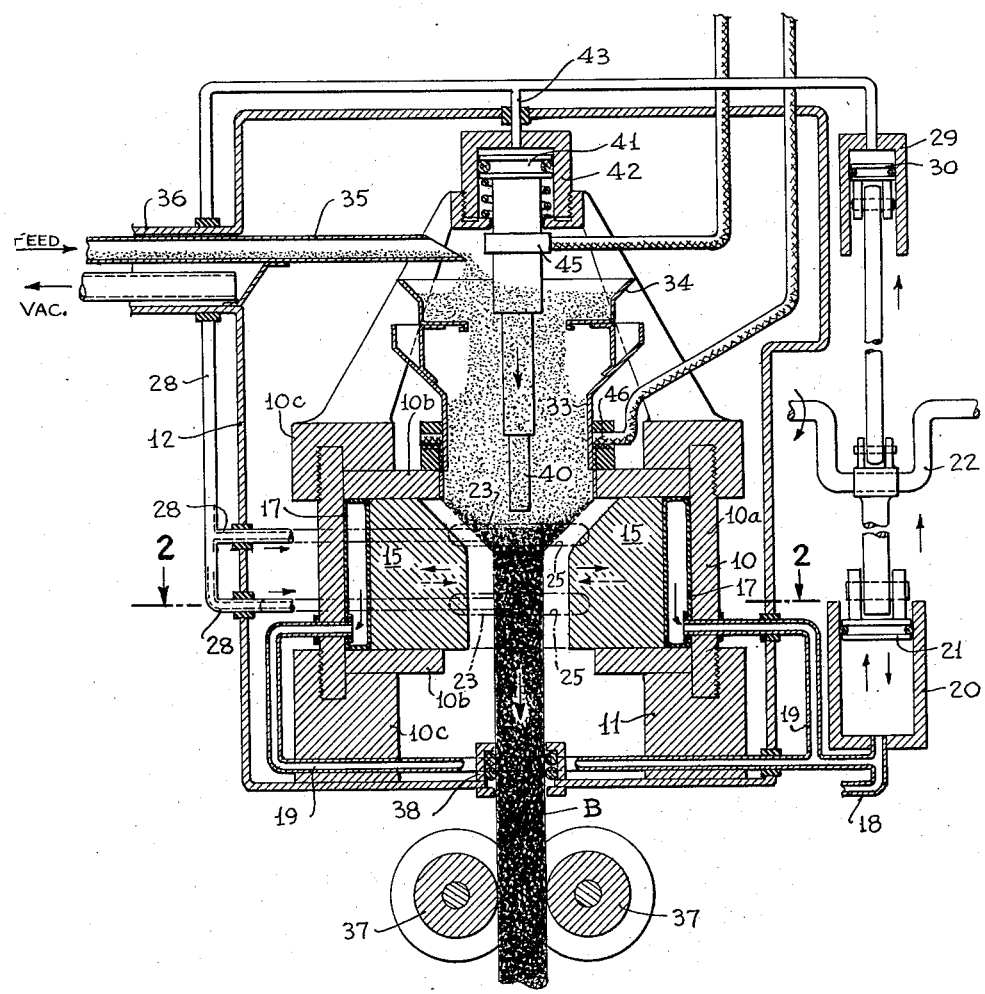
Figure 2:
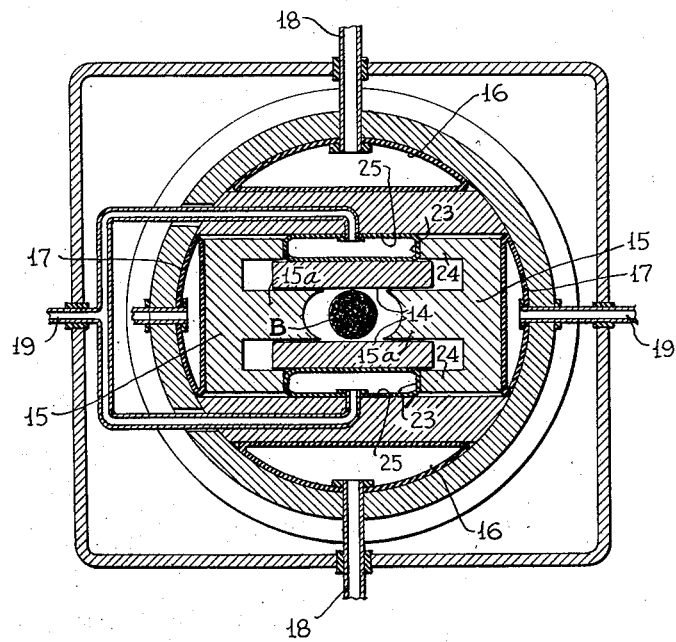

The above and other objects and advantages of the invention will be apparent from the following description of an exemplary embodiment, reference being made to the accompanying drawings wherein:

Fig. 1 is a vertical section through an extrusion press embodying the invention; and Fig. 2 is a horizontal section taken about on the line 2—2 of Fig. 1.

As shown in the drawings, an extrusion container 10 is mounted on a base 11 and is completely sealed from the air by an enclosure 12. The container 10 may be very simply formed of a large tube 10a, heads 10b, and clamp rings 10c. The lower clamp ring 10c forms part of the base 11. Not all of the entire base is shown.

The compression chamber is formed by a pair of lateral or side confining walls 14 and lateral plungers 15 having ram-like elements or projections 15a which slide between the inner surfaces of the side confining walls 14. The projections 15a are preferably concave on their ends in horizontal section to make a continuous bar B which is oval or round in section. In vertical section the projections 15a are straight at their lower ends and flare outward at their upper ends, the angle so far found most suitable for titanium scrap being about 45°.

The lateral confining and compressing elements 14 and 15 are moved inward by any suitable power means, a very simple means comprising inflatable pressure bags 16 for the lateral confining walls 14, and similar inflatable bags 17 for the plungers 15. Pressure fluid lines 18 for liquid serve the pressure bags 16 and lines 19 serve the bags 17. A simple form of power device for supplying the pressure fluid as it is needed in timed pulsations is represented by a pressure cylinder 20 having a piston 21 operated by a power-actuated crankshaft 22.

After each lateral compressing action the pressure on the side walls 14 and plungers 15 is released and the bar is left free to slide down along the walls without spalling or sticking, the walls moving back as much as is necessary but for usual materials being only a very small distance so that no material can fall between the guide walls and the sides of the plungers. It is preferable to move the plungers 15 back positively and for this purpose fluid pressure bags 23 are disposed between small projections 24 at a couple of places along the height of the plungers, the bags 23 and projections 24 being received within horizontal bores 25 provided in the side wall elements 14. Sufficient free motion is provided for the projections in the bores or between the projections and their engagement with the plungers 15 to avoid binding due to the relative transverse movements of the side walls and plungers.

The bags 23 for the return of the plungers are supplied with liquid pressure fluid by lines 28, a cylinder 29, and a piston 30 driven by the crankshaft 22 but in opposite phase to the pressure stages in the other cylinder 20.

Material to be compressed is supplied to one or more funnel-like receptacles within the main enclosure leading to the compression chamber. As shown, there is a lower funnel 33 leading to the chamber and an upper funnel 34 which receives material from a vibrating conveyor 35. The conveyor is enclosed by a tubular enclosure 36 leading to a fully enclosed supply source (not shown). Means to draw a vacuum is provided at the tubular enclosure. The material supplied is first thoroughly cleaned, degreased, and cleared of gas inclusions before it is fed. Preferably the lower funnel 33 is insulated where it is secured to the container 10.

The issuing rod is enclosed where it leaves the enclosure 12 by a seal 38 which is preferably filled with an inert gas to exclude the entry of air, this being especially useful if the rod has any porosity.

The lateral compressing means fully release the rod, as stated above, and the seal 38 does not apply much friction on the rod, so that the rod, the compressed head portion at its upper end, and the loose material above the head tend to drop down by gravity; but means are provided for moving the formed rod or bar down positively just in case it may tend to stick on the sides. The rod may be moved by rolls or grippers 37 at the issuing end, but since it may not have much tensile strength, it is preferred to provide means for pushing the rod down from above and this means is so devised as to act on compacted material without unduly compacting the loose material above the head of the rod.

As shown, the rod or bar ejecting means comprises an axial plunger or ram 40 operated by a piston 41 operating in a cylinder 42. The cylinder 42 is supplied with liquid pressure fluid from the pump cylinder 29 by a fluid line 43. The lower end of the plunger 40 is relatively small, as shown, being smaller than the diameter of the issuing bar, so as to pass through loose material until it engages compressed material or hard core at the center of the bar to force the bar down without compacing loose material. The rod or bar and its head drop down until the head engages the flared portion of the lateral plungers 15 as retracted, the head being sufficiently compacted to stop against the plungers in this position without crumbling.

In action, the pump cylinders 20 and 29 are alternately put under pressure by the crankshaft 22, the liquid fluid pulsating in the lines to the plungers so that at one stage the side walls 14 and lateral plungers 15 are forced inward and at the alternate stage the plungers 15 are retracted and side walls 14 relieved and the axial plunger 40 operated to force the rod down.

The action continues by alternate pulsating actions, no valves being required and no leakage involved.

The apparatus is adapted to compress particulate material in either cold or heated condition, but is especially suited for handling cold material. However, for an aid in softening material prior to compression when necessary, heating means are provided for producing arc or resistance heating through loose material between the plunger 40 and the funnel 33, one electrode 45 of a heating current circuit being attached to the plunger 40 and the other electrode 46 being attached to the funnel 33, flexible leads being used for the supply connections.

In operation, the cleaned and purified material is fed in as required by the vibrating conveyor 35 and passes down through the funnels 34, 33 into the compressing space. The funnels may also be vibrated, if desired, to cause some initial compacting of the material, this being useful when heating current is passed through. For starting up the first time, a sealing plug is placed in the bottom of the press to be pushed out as the rod forms. For all shut-downs thereafter, except for clean out, a stub rod or bar is left in the bottom of the press.

The plungers 15 and sidewalls 14 are pressed inward, the sidewalls closing quickly since they have only a short movement, and compress material; they are then relieved so the sidewalls can open and the plungers are pushed out by the pressure devices 23 so the bar and material can move down. The alternate stroke causes the devices 23 to force the plungers back and to force the ram 40 down to eject a length of the bar. The upper part or head of the bar receives several squeezing actions before it reaches the straight part of the plungers and the straight part receives several squeezing actions before it leaves the lower end of the press so that a very compact bar is produced. The interior portion of the head end will be more compacted than the outer portions and this works well with the small plunger 40 which moves down in the center to engage the compact core part to push the bar down.

It is to be noted that the positive power action through the liquid or hydraulic power devices on the sidewalls brings the side portions of the material positively into shape so that the side walls will release the material when they move back, as they will when the pressure is relieved. Heretofore it has been proposed to hold the sidewalls with springs, but these merely yield and the sides remain outward as pressure increases and material jams between the sidewalls and the plungers and the press soon clogs up. The positive power action on the sidewalls prevents this, yet when the power is relieved they can yield and open enough to allow the material to be pushed down. The sidewalls move back only slightly, as stated, to release the formed rod or bar but not enough to allow material to enter between them and the sides of the plungers.

The alternating action continues as the crankshaft 22 applies pressure in cylinders 20 and 29 in alternation, no valves or controls for the fluid being needed. The bag-like pressure elements 16, 17, 23 have no sliding parts or packed joints so there is no leakage. The cylinders 20, 29 and 42 have no appreciable leakage but for full safety they can be made as sealed diaphragm pumps in known manner. Then there is nowhere any possibility of leakage.

It is thus seen that the invention provides simple yet very effective means for compressing particulate material into coherent bar form. While one embodiment has been disclosed in detail by way of illustration, it is to be understood that there may be various embodiments within the scope of the invention.

What is claimed is:

1. Apparatus for forming a bar from particulate material in successive increments of length, comprising in combination, a casing surrounding the space in which the bar is to be formed, the casing being open at the ends for receiving material at one end and for the outgo of the formed bar at the other end, opposed parallel lateral guide walls defining part of a press space in which material is compressed into a bar, at least one of said lateral walls being movable toward and from the axis of the space in which the bar is to be formed, power means for moving said movable lateral guide wall positively inward with sufficient force to compress material, opposed pressing plunger walls disposed between said lateral guide walls defining the remainder of the press space in which the bar is formed, said press plunger walls having straight parallel sides at the outgoing end and flaring sides thereabove, at least one of said pressing plunger walls being mounted for movement toward and from the axis of the space in which the bar is to be formed, independent power means for moving said movable press plunger wall inward with sufficient force to compress material, means for moving said movable press plunger wall back away from the formed bar after each forward pressing stroke, and a vertically movable plunger mounted and operated for acting upon the upper end of the formed bar for moving it forward after each compressing action when it is released, said vertically movable plunger being considerably smaller in cross-section than the formed bar, being located in a central position to act through loose material upon the interior portion of the upper end of the formed bar, and having a stroke to move its lower end through the space between the flaring sides of the press plunger walls.

2. Apparatus as set forth in claim 1, further characterized by the fact that said lateral guide walls are provided with guide spaces and that said movable plunger wall is provided with projections reciprocably disposed in said guide spaces, and means within said spaces for moving the plunger wall back after each forward pressing stroke.

3. Apparatus as set forth in claim 1, further characterized by the fact that said lateral guide walls are provided with guide spaces and that said movable plunger wall is provided with projections reciprocably disposed in said guide spaces, and means within said spaces for moving the plunger wall back after each forward pressing stroke, said guide spaces being located behind the material-engaging surfaces and being oversized laterally to accommodate in and out movement of the lateral guide walls.

4. Apparatus as set forth in claim 1, further characterized by the fact that said lateral guide walls are provided with guide spaces and that said movable plunger wall is provided with projections reciprocably disposed in said guide spaces, and means within said spaces for moving the plunger wall back after each forward pressing stroke, said means within said guide spaces for moving the plunger wall back comprising hydraulic power devices.

5. Apparatus for forming a bar from particulate material in successive increments of length, comprising in combination, a casing surrounding the space in which the bar is to be formed, the casing being open at the ends for receiving material at one end and for the outgo of the formed bar at the other end, opposed parallel lateral guide walls mounted within said casing and defining part of a press space in which material is to be compressed into a bar, said lateral guide walls being mounted for movement toward and from the axis of the space in which the bar is to be formed, elastic bags with hydraulic fluid connections disposed behind said lateral walls within said casing and acting against said casing for positively moving said walls inward, opposed pressing plunger walls slidably mounted between the inner surfaces of said lateral guide walls for movement toward and from the axis of the space in which the bar is to be formed, elastic bags with hydraulic fluid connections disposed behind said plunger walls within said casing and acting against said casing for positively moving said plunger walls inward, means for moving said plunger walls outward after each inward pressing movement, the plunger walls having relatively great movement to perform the pressing operation and the lateral walls having relatively very small movement just sufficient to move back to release the formed bar but not enough to allow material to fall between the lateral walls and the plunger walls, and a vertically movable plunger mounted and operated for acting on the upper end of the formed bar for advancing it after each compressing action when released, said vertically movable plunger being considerably smaller in cross-section than the formed bar, being located in a central position to act through loose material upon the interior portion of the upper end of the formed bar, and having a stroke to move its lower end through the space between the flaring sides of the press plunger walls.

6. Apparatus as set forth in claim 5, in which said lateral guide walls are provided with guide bores and in which said plunger walls are provided with projections loosely disposed in said bores to permit in and out movement of the lateral walls, and elastic bags with flexible hydraulic fluid connections within said bores for moving said plunger walls back outward.

7. Apparatus as set forth in claim 5, in which said lateral guide walls are provided with guide bores and in which said plunger walls are provided with projections loosely disposed in said bores to permit in and out movement of the lateral walls, and elastic bags with flexible hydraulic fluid connections within said bores for moving said plunger walls back outward, said bags for the inward movement of the lateral guide walls and plunger walls on the one hand and said bags for the outward or return movement of the plunger walls on the other hand being respectively connected in opposite phase to a closed system valveless pulsating pump system for operation in alternation in opposite phase by the continuous operation of said pulsating pump system.

8. Apparatus for forming a bar from particulate material in successive increments of length, comprising in combination, laterally movable press members and operating means therefor for successively compressing incoming loose material in successive increments of length to form a continuous coherent bar, the press members having parallel surfaces on the end at the outgoing formed bar and having flared surfaces at the end of the incoming material, and a plunger mounted above the incoming end of the press members and having a movement through the space between the flared portion of the press members, said plunger being relatively much smaller in diameter than that of the formed bar and that of the space between the flared portion of the press members in closed position and being disposed and arranged to move along the axis of the bar and having sufficient length and stroke on its downward movement to engage the hard core of the bar near the level of the lower end of said flared space without engaging and compacting loose material disposed outwardly of the line of the bar within said flared space, and means for forcing said plunger down when said press members are open to force the bar down between the open press members.

9. Apparatus as set forth in claim 8 which further includes a material feed guide above the press members carrying particulate material thereabove in which said plunger moves, and means for establishing a heating electric current of suitable characteristics between said guide and plunger through the material for heating and softening it as it flows to said press members.

References Cited in the file of this patent

UNITED STATES PATENTS

| | | |
|---|---|---|
| 2,289,787 | Kaschke et al. | July 14, 1942 |
| 2,411,043 | Klassen | Nov. 12, 1946 |
| 2,656,743 | Leavenworth | Oct. 27, 1953 |
| 2,708,770 | Herres et al. | May 24, 1955 |
| 2,784,453 | Hjulian | Mar. 12, 1957 |